United States Patent [19]

Chatterji et al.

[11] Patent Number: 4,466,837

[45] Date of Patent: Aug. 21, 1984

[54] LIQUID WATER LOSS REDUCING ADDITIVES FOR CEMENT SLURRIES

[75] Inventors: Jiten Chatterji; Bobby G. Brake; John M. Tinsley, all of Duncan, Okla.

[73] Assignee: Halliburton Company, Duncan, Okla.

[21] Appl. No.: 446,305

[22] Filed: Dec. 3, 1982

Related U.S. Application Data

[63] Continuation of Ser. No. 126,595, Mar. 3, 1980, abandoned.

[51] Int. Cl.$^3$ .................... C08L 1/08; C04B 7/353
[52] U.S. Cl. .................... 106/85; 106/93; 106/193; 106/194; 166/292; 252/8.55 R
[58] Field of Search .................... 106/93, 197, 85, 193, 106/194; 166/292, 293; 252/8.55 R, 8.55 D

[56] References Cited

U.S. PATENT DOCUMENTS

| 2,874,778 | 2/1959 | Kaueler | 106/293 |
| 4,239,629 | 12/1980 | Sauber | 252/316 |
| 4,258,790 | 3/1981 | Hale | 166/293 |
| 4,321,968 | 3/1982 | Clear | 166/293 |
| 4,369,843 | 1/1982 | Mondshine | 166/292 |

FOREIGN PATENT DOCUMENTS

723206 12/1965 Canada .

Primary Examiner—Theodore Morris
Attorney, Agent, or Firm—G. Keith deBrucky; Thomas R. Weaver

[57] ABSTRACT

Liquid water loss reducing additives for use in cement slurries are provided comprised of aqueous solutions of low molecular weight carboxymethylhydroxyethyl-cellulose polymers. Methods of using the additives are also provided.

15 Claims, No Drawings

LIQUID WATER LOSS REDUCING ADDITIVES FOR CEMENT SLURRIES

This application is a continuation, of application Ser. No. 126,595, filed Mar. 3, 1980 now abandoned.

In the drilling and completing of oil, gas and water wells, cement slurries are commonly utilized for carrying out cementing procedures such as cementing casing in the well bore, sealing subterranean zones penetrated by the well bore, etc. In most cases, the cement slurry is pumped into the well bore and allowed to harden once it is in place in well bore or desired zone in a formation.

A variety of additives have been developed and utilized heretofore for improving the properties of cement slurries and bringing about desired results including additives for reducing the water loss from cement slurries while and/or after the slurries are placed. Excessive water loss from a cement slurry can prevent proper hydration of the cement. Excessive water loss from a cement slurry while being flowed through a well bore can result in a total dehydration during circulation which will prevent completion of cement displacement.

Water loss reducing additives utilized heretofore in cement slurries are solids and require the use of dry blending and mixing equipment in order to combine the additives with the slurries. In offshore drilling operations, and other drilling operations having space and storage limitations or lacking dry blending equipment, the requirement that such additive be dry blended into cement slurries is disadvantageous.

By the present invention, liquid water loss reducing additives for cement slurries are provided which can be easily combined with the water used to form the cement slurries thereby reducing the time, equipment required and expense involved in forming the slurries. The liquid additives of the present invention effectively reduce the water loss from cement slurries and bring about other desired results. More specifically, the additives significantly reduce the adverse effect of utilizing sea water to form cement slurries, and there in turn, reduce the additive concentration required in cement slurries formed with sea water.

The liquid water loss reducing additives of the present invention are comprised of aqueous solutions of low molecular weight carboxymethylhydroxyethylcellulose polymers. More specifically, the carboxymethylhydroxyethylcellulose polymers useful in accordance with this invention have a carboxymethyl degree of substitution (D.S.) in the range of from about 0.1 to about 0.7 and a ratio of moles of ethylene oxide to anhydroglucose unit (M.S.) in the range of from about 0.7 to about 2.5. The carboxymethylhydroxyethylcellulose polymers are derived from the cellulose class represented as a series of anhydroglucose units as follows:

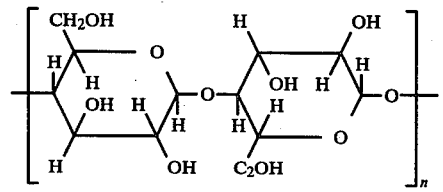

The portion of the above structural formula in brackets constitutes two anhydroglucose units, each having three reactive hydroxyl groups. n is an integer which gives the desired polymer molecule length.

When the cellulose polymer is treated with sodium hydroxide and reacted with chloroacetic acid and ethylene oxide under controlled conditions, carboxymethylhydroxyethylcellulose is produced shown as follows:

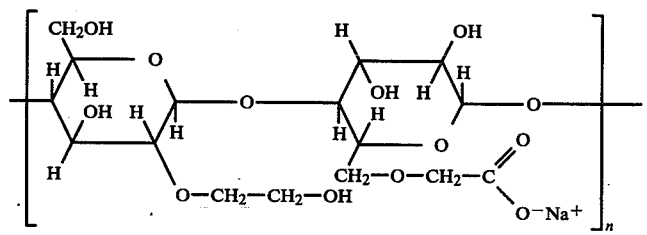

The sodium salt of carboxymethylhydroxyethylcellulose shown above has one of the side hydroxyl groups substituted by carboxymethyl, and therefore, the carboxymethyl degree of substitution (D.S.) is .5 per anhydroglucose unit. As stated above, the preferred carboxymethyl degree of substitution for the carboxymethylhydroxyethylcellulose used in accordance with this invention is in the range of from about 0.1 to about 0.7. At a carboxymethyl D.S. of less than about 0.1, the carboxymethylhydroxyethylcellulose has limited solubility in water. At a carboxymethyl D.S. above about .7, the carboxymethylhydroxyethylcellulose has too much anionic characteristic and causes a precipitate to be formed when combined with a cement slurry.

The above structural formula also shows that the ratio of moles of ethylene oxide to anhydroglucose unit (M.S.) is one mole for two units or 0.5. The preferred ethylene oxide M.S. for the carboxymethylhydroxyethylcellulose used in accordance with this invention is in the range of from about 0.7 to about 2.5. Carboxymethylhydroxyethylcellulose having an ethylene oxide M.S. outside a range of from about 0.7 to about 2.5 does not give adequate water loss reducing properties to a cement slurry and/or does not impart desired viscosity properties in an aqueous solution.

The molecule length of the carboxymethylhydroxyethylcellulose polymers, i.e., the molecular weight of the polymers, must be relatively low in order to be soluble in and to impart a relatively low viscosity to, an aqueous solution thereof. More specifically, the carboxymethylhydroxyethylcellulose polymers suitable for use in accordance with the present invention have a molecular weight such that a 5% by weight aqueous solution of the carboxymethylhydroxyethylcellulose at a temperature of 78° F. has a viscosity in the range of from about 75 to about 300 centipoises measured on a Brookfield viscometer at 60 rpm using a No. 4 spindle. At molecular weights higher than those falling within the above definition, the viscosity of an aqueous solution of the carboxymethylhydroxyethylcellulose has too high a viscosity to be useful.

The Brookfield viscometer referred to herein is a Brookfield Synchro-Lectric Viscometer, model LVT, 116 volt manufactured by Brookfield Engineering Laboratories, Inc. of Stoughton, Massachusetts.

A preferred liquid water loss reducing additive of this invention is comprised of an aqueous solution of carboxymethylhydroxyethylcellulose having a carboxymethyl D.S. in the range of from about 0.1 to about 0.7 and an ethylene oxide M.S. in the range of from about 0.7 to about 2.5 and having a molecular weight such that a 5% by weight aqueous solution of said carboxymethylhydroxyethylcellulose at a temperature of 78° F. has a viscosity in the range of from about 75 to about 250 centipoises measured on a Brookfield viscometer at 60 rpm using a No. 4 spindle, the carboxymethylhydroxyethylcellulose being present in the solution in an amount in the range of from about 5% by weight of the solution.

A more preferred such liquid additive is comprised of an aqueous solution of carboxymethylhydroxyethylcellulose having a carboxymethyl D.S. of about 0.4 and an ethylene oxide M.S. of about 2 and having a molecular weight such that a 5% by weight aqueous solution of said carboxymethylhydroxyethylcellulose at a temperature of 78° F. has a viscosity in the range of from about 100 to about 200 centipoises measured on a Brookfield viscometer at 60 rpm using a No. 4 spindle, the carboxymethylhydroxyethylcellulose being present in the solution in an amount in the range of from about 5% to about 15% by weight of the solution.

Another preferred additive of the present invention includes an organic sulfonate dispersing agent which functions when present in a cement slurry to disperse the solid cementitious materials in the slurry thereby decreasing the quantity of water required. Examples of such organic sulfonates are the salts of polyvinyl sulfonic acid and napthol sulfonic acid condensed with formaldehyde. A particularly preferred such organic sulfonate dispersing agent for use in accordance with the present invention is the sodium salt of napthalene sulfonate condensed with formaldehyde. Such dispersing agent is preferably present in the additive of the present invention in an amount in the range of from about 2% to about 5% by weight of the additive.

The additive of the present invention can also include a base which functions to make sea water more compatible for use in forming cement slurries. Sea water by itself, when used to form a cement slurry containing additives, reacts with cement and the additives to some degree requiring higher concentrations than when the cement slurry is formed from fresh water. By combining a base with the sea water, the base reacts with or neutralizes components in the sea water whereby the adverse affect thereof on cement and additives is substantially reduced. In addition, the presence of a base in the additive prevents bacteria growth in the additive and thereby increases the shelf or storage life of the additive. Preferably, the additive of the present invention includes a base selected from the group consisting of sodium hydroxide and potassium hydroxide present in the additive in an amount in the range of from about 2% to about 5% by weight of the additive.

A preferred additive including an organic sulfonate dispersant is comprised of water, carboxymethylhydroxyethylcellulose having a carboxymethyl D.S. in the range of from about 0.1 to about 0.7 and an ethylene oxide M.S. in the range of from about 0.7 to about 2.5 and having a molecular weight such that a 5% by weight aqueous solution of said carboxymethylhydroxyethylcellulose at a temperature of 78° F. has a viscosity in the range of from about 75 to about 300 centipoises measured on a Brookfield viscometer at 60 rpm using a No. 4 spindle, and an organic sulfonate dispersing agent present in said additive in an amount in the range of from about 2% to about 5% by weight of said additive. As indicated above, the most preferred organic sulfonate additive is the sodium salt of napthalene sulfonate condensed with formaldehyde present in the additive in the amounts given above.

A preferred additive including an organic sulfonate dispersing agent and a base is comprised of water, carboxymethylhydroxyethylcellulose having a carboxymethyl D.S. in the range of from about 0.3 to about 0.5 and an ethylene oxide M.S. in the range of from about 0.7 to about 2 and having a molecular weight such that a 5% by weight aqueous solution of said carboxymethylhydroxyethylcellulose at a temperature of 78° F. has a viscosity in the range of from about 75 to about 250 centipoises measured on a Brookfield viscometer at 60 rpm using a No. 4 spindle, an organic sulfonate dispersing agent present in the additive in an amount in the range of from about 2% to about 5% by weight of the additive, and a base selected from the group consisting of sodium hydroxide and potassium hydroxide present in the additive in an amount in the range of from about 2% to about 5% by weight of the additive.

The most preferred liquid water loss reducing additive for use in cement slurries of the present invention comprises water, carboxymethylhydroxyethylcellulose having a carboxymethyl D.S. of about 0.4 and an ethylene oxide M.S. of about 2 and having a molecular weight such that a 5% by weight aqueous solution of said carboxymethylhydroxyethylcellulose at a temperature of 78° F. has a viscosity in the range of from about 100 to about 200 centipoises measured on a Brookfield viscometer at 60 rpm using a No. 4 spindle said carboxymethylhydroxyethylcellulose being present in said additive in the amount of about 15% by weight of the additive, the sodium salt of napthalene sulfonate condensed with formaldehyde present in the additive in an amount of about 3% by weight of the additive, and sodium hydroxide present in the additive in an amount of about 3.25% by weight of the additive.

In carrying out the method of the present invention for reducing the water loss from a cement slurry used for cementing a well, the liquid water loss reducing additive is combined with the water used to form the cement slurry prior to combining cement and other components utilized with the water-liquid additive mixture. In this technique, a minimum of mixing equipment and time is required. However, any order of mixing of the cement, water, liquid fluid loss additive and other components or additives used can be utilized. Once the cement slurry containing the liquid water loss reducing additive of this invention is prepared, the cement slurry is pumped or otherwise introduced into a well bore and conducted to the zone or area to be cemented therein followed by allowing the cement to harden. As stated above, the liquid additive of the present invention containing a base and an organic sulfonate dispersing agent functions to reduce water loss from a cement slurry during and after placement in a desired zone, reduces the quantity of water required for forming the cement slurry and allows sea water to be utilized in forming the slurry without disadvantage.

The particular quantity of the liquid additive of the present invention combined with a cement slurry can vary depending upon various factors such as the amount of water loss reduction desired and the temperature of the zone or area to be cemented. Generally, the boxymethyl D.S. of 0.3 and an ethylene oxide M.S. of .7 are used to prepare fresh water solutions containing various concentrations of the polymers. The viscosity of each of the aqueous solutions is measured on a Brookfield viscometer at room temperature using a No. 4 spindle and the rpm indicated in Table I. The results of these tests are given in Table I below.

TABLE I

VISCOSITIES OF AQUEOUS SOLUTIONS OF VARIOUS CARBOXYMETHYLHYDROXYETHYL CELLULOSE POLYMERS

| Carboxymethyl D.S. | Ethylene Oxide M.S. | Molecular Weight of Polymer | Viscosity, CPS | | | | | R.P.M. At Which Reading Taken |
|---|---|---|---|---|---|---|---|---|
| | | | 1% By Weight Solution | 2% By Weight Solution | 5% By Weight Solution | 10% By Weight Solution | 15% By Weight Solution | |
| 0.4 | 2 | Low | 50 | — | 150 | — | — | 60 |
| 0.4 | 2 | Low | — | — | — | 1400 | 9000 | 30 |
| 0.4 | 2 | Extremely High | 2000 | — | — | — | — | 30 |
| 0.4 | 2 | Extremely High | — | 64,000,000 | — | — | — | 1.5 |
| 0.3 | 0.7 | High | 200 | — | 1100 | — | — | 30 |
| 0.3 | 0.7 | High | — | — | — | 348,000,000 | — | 1.5 | more additive utilized, the greater the reduction in water loss from a cement slurry, and the higher the temperature to which the cement slurry is exposed, the more additive required. In most circumstances, the liquid additive of the present invention is combined with a cement slurry in an amount in the range of from about 7.5 to about 15% by weight of water utilized to form the slurry. At a cement slurry circulating temperature of about 100° F., a quantity of liquid additive in an amount of about 8% by weight of water used to form the cement slurry is generally utilized. At a circulating temperature of about 200° F., 14.5% by weight of water used is utilized.

The preferred additive described above containing an organic sulfonate dispersant and a base is preferably combined with a cement slurry in an amount in the range of from about 7.5% to about 15% by weight of water used to form the slurry resulting in excellent water loss reduction, reduction in friction encountered in pumping the cement slurry, and reduction in the quantities of additive required when sea water is used to form the slurry.

In order to present a clear understanding of the additives and methods of the present invention, the following examples are given:

EXAMPLE 1

Low molecular weight carboxymethylhydroxyethylcellulose polymers having a carboxymethyl D.S. of 0.4 and an ethylene oxide M.S. of 2, extremely high molecular weight carboxymethylhydroxyethylcellulose polymers having a carboxymethyl D.S. of 0.4 and an ethylene oxide M.S. of 2 and high molecular weight carboxymethylhydroxyethylcellulose polymers having a car- From Table I it can be seen that carboxymethylhydroxyethylcellulose having a carboxymethyl D.S. of 0.4, an ethylene oxide M.S. of 2 and a low molecular weight when dissolved in water up to 15% by weight, imparts a relatively low viscosity to the solution. It can also be seen that high molecular weight polymers have limited solubility in water and impart extremely high viscosities thereto. High molecular weight polymers having a carboxymethyl D.S. of 0.3 and an ethylene oxide M.S. of 0.7 also have somewhat limited solubility and impart high viscosities to aqueous solutions thereof.

EXAMPLE 2

Cement slurries are prepared using Lone Star Class H cement and synthetic sea water at a water to cement weight ratio of 0.46. A liquid water loss reducing additive of the present invention containing low molecular weight carboxymethylhydroxyethylcellulose polymers (carboxymethyl D.S. of 0.4 and ethylene oxide M.S. of 2) is combined with one of the cement slurries and the API fluid loss of the cement slurries is measured. The procedure is repeated using carboxymethylhydroxyethylcellulose polymers having a carboxymethyl D.S. of 0.3 and an ethylene oxide M.S. of 0.7 and high molecular weight carboxymethylhydroxyethylcellulose polymers having a carboxymethyl D.S. of 0.4 and an ethylene oxide M.S. of 2.

The water utilized to form the cement slurries is comprised of 41.953 grams of sea-salt (ASTM D-1141-52. Lake Products Co., Inc., St. Louis, Missouri) dissolved in fresh water to make 1 liter of synthetic sea water. The fluid loss values are measured by standard API methods (API RP-10B "Recommended Practices for Cements and Additives") using a 325 mesh screen at 1000 psi.

TABLE II

COMPARISON OF FLUID LOSS FROM CEMENT SLURRIES CONTAINING VARIOUS CARBOXYMETHYLHYDROXYETHYLCELLULOSE POLYMERS

| Water To Lone Star Class H Cement Weight Ratio | Carboxymethyl D.S. of Polymer | Ethylene Oxide M.S. of Polymer | Molecular Weight of Polymer | % By Weight Polymer In Cement Slurry | % By Weight Organic Sulfonate Dispersing Agent In Slurry[1] | % By Weight NaOH In Slurry | Temperature At Which Fluid Loss Measured, °F. | API Fluid Loss, cc/30 Mins. |
|---|---|---|---|---|---|---|---|---|
| 0.46 | 0.4 | 2 | Low | 0.8 | 0.5 | 0.2 | 190 | 40 |
| 0.46 | 0.3 | 0.7 | Low | 0.8 | 0.5 | 0.2 | 190 | 44 |

TABLE II-continued
COMPARISON OF FLUID LOSS FROM CEMENT SLURRIES CONTAINING VARIOUS CARBOXYMETHYLHYDROXYETHYLCELLULOSE POLYMERS

| Water To Lone Star Class H Cement Weight Ratio | Carboxymethyl D.S. of Polymer | Ethylene Oxide M.S. of Polymer | Molecular Weight of Polymer | % By Weight Polymer In Cement Slurry | % By Weight Organic Sulfonate Dispersing Agent In Slurry[1] | % By Weight NaOH In Slurry | Temperature At Which Fluid Loss Measured, °F. | API Fluid Loss, cc/30 Mins. |
|---|---|---|---|---|---|---|---|---|
| 0.46 | 0.4 | 2 | High | 0.4 | 0.5 | 0.2 | 190 | 100 |

[1]Sodium salt of napthalene sulfonate condensed with formaldehyde

From Table II it can be seen that the liquid additives of the present invention containing low molecular weight carboxymethylhydroxyethylcellulose polymers having a carboxymethyl D.S. of 0.4 and an ethylene oxide M.S. of 2 produced the best reduction in fluid loss as compared to additives containing high molecular weight carboxymethylhydroxyethylcellulose polymers having a carboxymethyl D.S. of 0.3 and an ethylene oxide M.S. of 0.7 and extremely high molecular weight polymers having a carboxymethyl D.S. of 0.4 and an ethylene oxide M.S. of 2.

EXAMPLE 3

Liquid water loss reducing additives of the present invention are prepared comprised of fresh water, 15% by weight carboxymethylhydroxyethylcellulose polymers having a carboxymethyl D.S. of 0.4, an ethylene oxide M.S. of 2 and a molecular weight such that a 5% solution of the carboxymethylhydroxyethylcellulose at a temperature of 78° F. has a viscosity in the range of from about 100 to about 200 centipoises measured on a Brookfield viscometer at 60 rpm using a No. 4 spindle, 3% by weight of the sodium salt of napthalene sulfonate condensed with formaldehyde and 3.25% by weight sodium hydroxide. The additives are combined with various cement slurries formed from Trinity Class H cement and Dyckerhoff Class G cement and the fluid losses, thickening times and 24-hour compressive strengths of the resulting cement slurries are determined.

Fluid loss measurements are determined in accordance with API standard methods (API RP-10B) on a 325 mesh screen at 1000 psi. Thickening times are determined using standard API methods (API RP-10B) and a high pressure and high temperature consistometer at modified casing schedules of 6000 feet at 110° F., 10,000 feet at 140° F. and 14,000 at 190° F. circulating temperatures. Compressive strengths are determined using standard API methods (API RP-10B) for periods of 24 hours. The water utilized to form the cement slurries is comprised of 41.953 grams of sea-salt (ASTM D-1141-52. Lake Products Co., Inc., St. Louis, Missouri) dissolved in fresh water to make 1 liter of synthetic sea water.

TABLE III
FLUID LOSS, THICKENING TIME AND COMPRESSIVE STRENGTH PROPERTIES OF VARIOUS CEMENT SLURRIES CONTAINING LIQUID WATER LOSS REDUCING ADDITIVE

| Cement Used | % By Weight Course Sand In Slurry | Water To Cement Weight Ratio | % By Weight Additive In Slurry | Temperature, °F. | API Fluid Loss, cc/30 Minutes | Thickening Time Hrs:Mins. | 24 Hour Compressive Strength, psi |
|---|---|---|---|---|---|---|---|
| Trinity Class H | 0 | 0.46 | 2.81 | 110 | 22 | — | — |
| Trinity Class H | 0 | 0.46 | 2.81 | 140 | 28 | 5:27 | 1970 |
| Trinity Class H | 35 | 0.46 | 3.33 | 190 | 42 | 2:40 | 2500 |
| Dyckerhoff Class G | 0 | 0.46 | 2.81 | 110 | 34 | — | — |
| Dyckerhoff Class G | 0 | 0.46 | 2.81 | 140 | 44 | 6:00 | 3057 |
| Dyckerhoff Class G | 35 | 0.46 | 3.33 | 190 | 150 | 3:17 | 5837 |

From Table III it can be seen that the liquid water loss reducing additive of the present invention produces excellent water loss reduction in cement slurries and the cement slurries containing the additive have good thickening times and compressive strengths.

What is claimed is:

1. A cementing composition useful in cementing oil and gas wells consisting essentially of sea water, cement and an additive consisting essentially of an aqueous solution of carboxymethylhydroxyethylcellulose having a carboxymethyl D.S. in the range of from about 0.1 to about 0.7 and an ethylene oxide M.S. in the range of from about 0.7 to about 2.5 and having a molecular weight such that a 5% by weight aqueous solution of said carboxymethylhydroxyethylcellulose at a temperature of 78° F. has a viscosity in the range of from about 75 to about 300 centipoises measured on a Brookfield viscometer at 60 rpm using a No. 4 spindle, a base selected from the group consisting of sodium hydroxide and potassium hydroxide, and an organic sulfonate dispersing agent.

2. The composition of claim 1 wherein the concentration of said carboxymethylhydroxyethylcellulose in said additive is in the range of from about 5% to about 15% by weight of said additive.

3. The composition of claim 1 wherein said base is present in said additive in an amount in the range of from abut 2% to about 5% by weight of said additive.

4. The composition of claim 1 wherein the organic sulfonate dispersing agent is the sodium salt of napthalene sulfonate condensed with formaldehyde.

5. The composition of claim 4 wherein said sodium salt of napthalene sulfonate condensed with formaldehyde is present in said additive in an amount in the range of from about 2% to about 5% by weight of said additive.

6. A cementing composition useful in cementing oil and gas wells consisting essentially of sea water, cement and an additive consisting essentially of:
water;

carboxymethylhydroxyethylcellulose having a carboxymethyl D.S. of about 0.4 and an ethylene oxide M.S. of about 2 and having a molecular weight such that a 5% by weight aqueous solution of said carboxymethylhydroxyethylcellulose at a temperature of 78° F. has a viscosity in the range of from about 75 to about 250 centipoises measured on a Brookfield viscometer at 60 rpm using a No. 4 spindle, said carboxymethylhydroxyethylcellulose being present in said additive in an amount in the range of from about 5% to about 15% by weight of said additive;

an organic sulfonate dispersing agent present in said additive in an amount in the range of from about 2% to about 5% by weight of said additive; and a base selected from the group consisting of sodium hydroxide and potassium hydroxide present in said additive in an amount in the range of from about 2% to about 5% by weight of said additive.

7. The composition of claim 6 wherein said carboxymethylhydroxyethylcellulose is present in said additive in an amount of about 15% by weight of said additive.

8. The composition of claim 7 wherein said organic sulfonate dispersing agent is the sodium salt of napthalene sulfonate condensed with formaldehyde and is present in said additive in an amount of about 3% by weight of said additive.

9. The composition of claim 8 wherein said base is sodium hydroxide and is present in said additive in an amount of about 3.25% by weight of said additive.

10. The composition of claim 9 wherein said carboxymethylhydroxyethylcellulose has a molecular weight such that a 5% by weight aqueous solution of said carboxymethylhydroxyethylcellulose at a temperature of 78° F. has a viscosity in the range of from about 100 to about 200 centipoises measured on a Brookfield viscometer at 60 rpm using a No. 4 spindle.

11. In a cementing composition useful in cementing oil and gas wells consisting essentially of sea water, cement and an additive for reducing water loss from the slurry during and after placement, the improvement comprising said additive being in the liquid state and consisting essentially of an aqueous solution of carboxymethylhydroxyethylcellulose having a carboxymethyl D.S. in the range of from about 0.3 to about 0.5 and an ethylene oxide M.S. in the range of from about 0.7 to about 2 and having a molecular weight such that a 5% by weight aqueous solution of said carboxymethylhydroxyethylcellulose at a temperature of 78° F. has a viscosity in the range of from about 75 to about 250 centipoises measured on a Brookfield viscometer at 60 rpm using a No. 4 spindle, a base selected from the group consisting of sodium hydroxide and potassium hydroxide present in said additive in an amount in the range of from about 2% to about 5% by weight of said additive and the sodium salt of napthalene sulfonate condensed with formaldehyde present in said additive in an amount in the range of from about 2% to about 5% by weight of said additive.

12. The composition of claim 11 wherein the concentration of said carboxymethylhydroxyethylcellulose in said aqueous solution is in the range of from about 5% to about 15% by weight of said solution.

13. The composition of claim 11 wherein said carboxymethylhydroxyethylcellulose has a carboxymethyl D.S. of about 0.4 and and ethylene oxide M.S. of about 2 and is present in said additive in an amount of about 15% by weight of said additive.

14. The composition of claim 13 which is further characterized to include sodium hydroxide present in said additive in an amount of about 3.25% by weight of said additive.

15. The additive of claim 14 which is further characterized to include the sodium salt of napthalene sulfonate condensed with formaldehyde present in said additive in an amount of about 3% by weight of said additive.

* * * * *